United States Patent
Wall et al.

(10) Patent No.: US 6,956,697 B2
(45) Date of Patent: Oct. 18, 2005

(54) FRONT-END CIRCULATOR FOR AN OPTICAL DEVICE

(75) Inventors: Pierre D. Wall, Ottawa (CA); Jeffrey F. Wheeldon, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 121 days.

(21) Appl. No.: 10/735,648

(22) Filed: Dec. 16, 2003

(65) Prior Publication Data

US 2004/0252375 A1 Dec. 16, 2004

Related U.S. Application Data

(60) Provisional application No. 60/506,176, filed on Dec. 20, 2002.

(51) Int. Cl.[7] .............................................. G02B 5/30
(52) U.S. Cl. ........................ 359/484; 359/495; 385/11
(58) Field of Search .............................. 359/484, 494, 359/495; 385/11

(56) References Cited

U.S. PATENT DOCUMENTS

| | | | |
|---|---|---|---|
| 5,574,596 A | 11/1996 | Cheng | 359/484 |
| 5,909,310 A | 6/1999 | Li et al. | 359/484 |
| 6,304,380 B1 * | 10/2001 | Doerr | 359/484 |
| 2001/0053022 A1 * | 12/2001 | Tai et al. | 359/484 |
| 2002/0071181 A1 * | 6/2002 | Frisken | 359/484 |
| 2002/0186914 A1 * | 12/2002 | Li | 385/11 |

* cited by examiner

Primary Examiner—Drew A. Dunn
Assistant Examiner—Mark Consilvio
(74) Attorney, Agent, or Firm—Teitelbaum & MacLean; Neil Teitelbaum; Doug MacLean (57) ABSTRACT

The invention relates to an optical circulator for use as a front end for an optical device platform, which requires a pair of like-polarized sub-beams as input. A combined beam of light comprising a plurality of wavelength channels is input the optical circulator at an input port, and the pair of like-polarized sub-beams is launched via a pair of input/output ports into the optical device platform, wherein the sub-beams are modified. Within the optical device platform the combined beam of light is separated into individual channels, and one or more of the channels can be dropped or attenuated before the remaining channels are recombined into to modified sub-beams for output. The two modified sub-beams are launched back into the optical circulator, which directs the modified sub-beams to an output port remote from the input port. Any light reentering the optical circulator with the wrong polarization will neither exit the input nor the output port.

12 Claims, 6 Drawing Sheets

FRONT-END CIRCULATOR FOR AN OPTICAL DEVICE

CROSS-REFERENCE TO RELATED APPLICATIONS

The present application claims priority from U.S. Patent Application 60/506,176 filed Dec. 20, 2002, which is incorporated herein by reference for all purposes.

TECHNICAL FIELD

The present invention relates to an optical circulator, and in particular to an optical circulator positioned at the front end of an optical device for launching an optical signal into the optical device and for redirecting the optical signal after modification by the optical device.

BACKGROUND OF THE INVENTION

Conventional circulators, such as those disclosed in U.S. Pat. No. 5,574,596 issued Nov. 12, 1996 to Yihao Cheng; and U.S. Pat. No. 5,909,310 issued Jun. 1, 1999 to Wei-Zhong Li et al are three port devices that direct light entering a first port to a second port, and light entering the second port back to a third port. Generally, the light entering the first port is divided into two sub-beams, the polarization of which is manipulated to enable the sub-beams to pass through a polarization-dependent beam director along a first path, after which the sub-beams are recombined for output. Similarly, light entering the second port is divided into two sub-beams, but the polarization thereof is manipulated so that the sub-beams pass through the polarization-dependent beam director along a second path, different than the first, whereby the sub-beams are recombined at the third port.

Unfortunately, these conventional circulators are designed to recombine the light beam traveling from the first port to the second port, and to receive a combined light beam at the second port for travel to the third port.

An object of the present invention is to overcome the shortcomings of the prior art by providing an optical circulator that outputs and receives like-polarized sub-beams instead of a single combined beam at the second port.

SUMMARY OF THE INVENTION

Accordingly, the present invention relates to a circulator device for launching on optical signal into an optical device and for outputting the optical signal after modification by the optical device comprising:

an input port for inputting the optical signal;

a polarization beam splitter optically coupled to the input port for separating the optical signal into first and second orthogonally polarized sub-beams;

a first polarization rotator for rotating the polarization of at least one of the first and second orthogonally polarized sub-beams of the optical signal, so that both sub-beams of the optical signal have the same polarization;

polarization beam directing means for directing optical sub-beams with a first polarization along one set of paths, and for directing optical sub-beams with a second polarization along another set of paths;

non-reciprocal polarization rotating means for rotating the polarization of optical sub-beams traveling in a first direction therethrough, while having no overall effect on the polarization of optical sub-beams traveling in a second direction therethrough;

a first input/output port for outputting the first sub-beam of the optical signal with the first polarization, and for inputting a first sub-beam of the modified optical signal with the first polarization, whereby the first sub-beam of the modified optical signal travels back through the non-reciprocal polarization rotating means and the polarization beam directing means;

a second input/output port for outputting the second sub-beam of the optical signal with the first polarization, and for inputting a second sub-beam of the modified optical signal with the first polarization, whereby the second sub-beam of the modified optical signal travels back through the non-reciprocal polarization rotating means and the polarization beam directing means;

a second polarization rotator for rotating the polarization of at least one of the first and second sub-beams of the modified optical signal, so that the sub-beams of the optical signal have orthogonal polarizations;

a polarization beam combiner optically coupled to the output port for combining first and second orthogonally polarized sub-beams of the modified optical signal; and an output port for outputting the modified optical signal;

whereby light entering the first and second input/output ports with the second polarization will be directed away from the input and output ports.

BRIEF DESCRIPTION OF THE DRAWINGS

The invention will be described in greater detail with reference to the accompanying drawings which represent preferred embodiments thereof, wherein.

DETAILED DESCRIPTION

With reference to FIGS. 1 to 4, the circulator 1 according to the present invention includes a first port 2 and a second port 3 adjacent each other on one end. The first port 2 launches a beam of light 4 into a first birefringent walk-off crystal 6 (Position A in FIG. 4), which splits the beam of light 4 into two orthogonally polarized sub-beams 7 and 8

Figure 1:
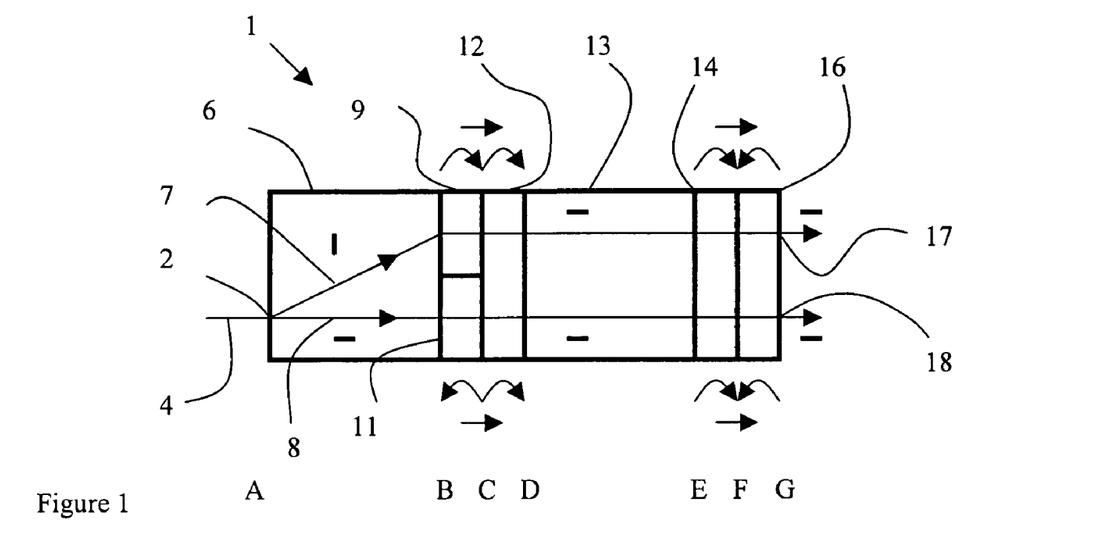
FIG. 1 is a plan view of the circulator according to the present invention illustrating light traveling from a first port to a third and fourth ports.
Figure 4:
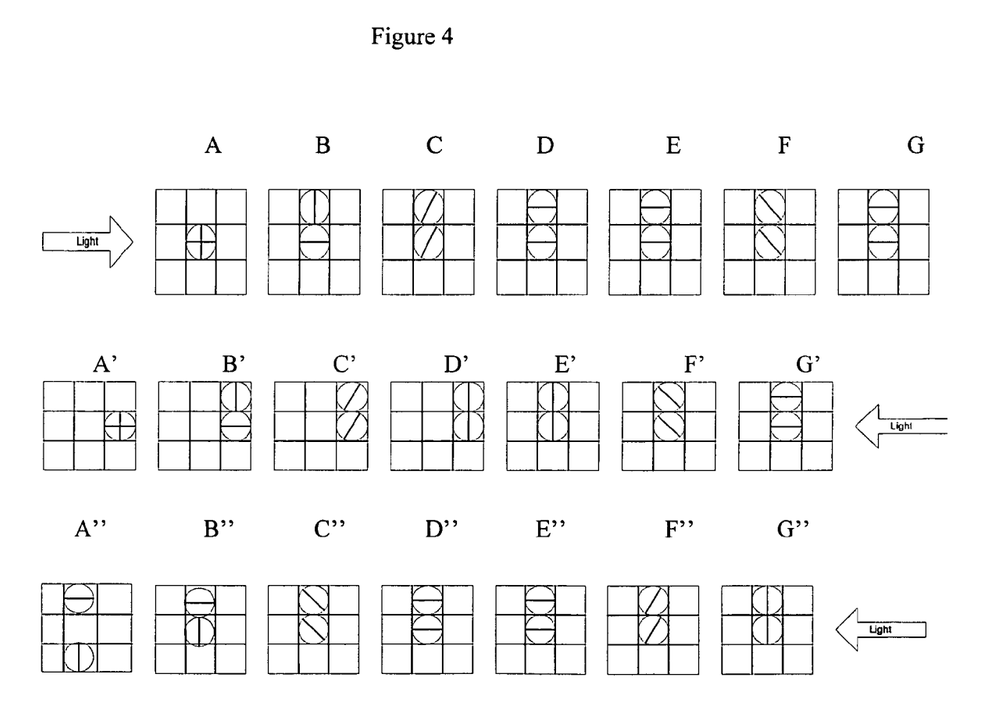
FIG. 4 is a chart of the polarizations of sub-beams of light traveling through the various elements of the circulator of FIGS. 1 to 3.

(Position B). Sub-beam 7 travels through a first half-wave plate 9, disposed with a birefringent axis at +22.5°, for rotating the polarization of the sub-beam 7 by +45°. The birefringent axis of a second half-wave plate 11 is oriented at −22.5° for rotating the polarization of the sub-beam 8 by −45°, whereby both sub-beams 7 and 8 have the same polarization (Position C). A first Faraday rotator 12 is positioned adjacent the first and second waveplates 9 and 11 for rotating the polarization of the sub-beams 7 and 8 by another +45°, whereby both sub-beams 7 and 8 are horizontally polarized (Position D). The horizontally polarized sub-beams 7 and 8 pass through a second birefringent walk-off crystal 13, which directs the sub-beams according to their polarization. Since the sub-beams 7 and 8 are horizontally polarized, they travel straight through the second birefringent walk-off crystal 13 (Position E). A second Faraday rotator 14 rotates the polarization of both sub-beams 7 and 8 by +45° (Position F), and a third half-wave plate 16 rotates both of the sub-beams 7 and 8 by −45° (Position G), whereby the combination of the second Faraday rotator 14 and the third half-wave plate 16 have no cumulative effect on the polarization of the sub-beams 7 and 8. A third port 17 is provided for outputting the sub-beam 7, while a fourth port 18 is provided for outputting the sub-beam 8.

Figure 5:
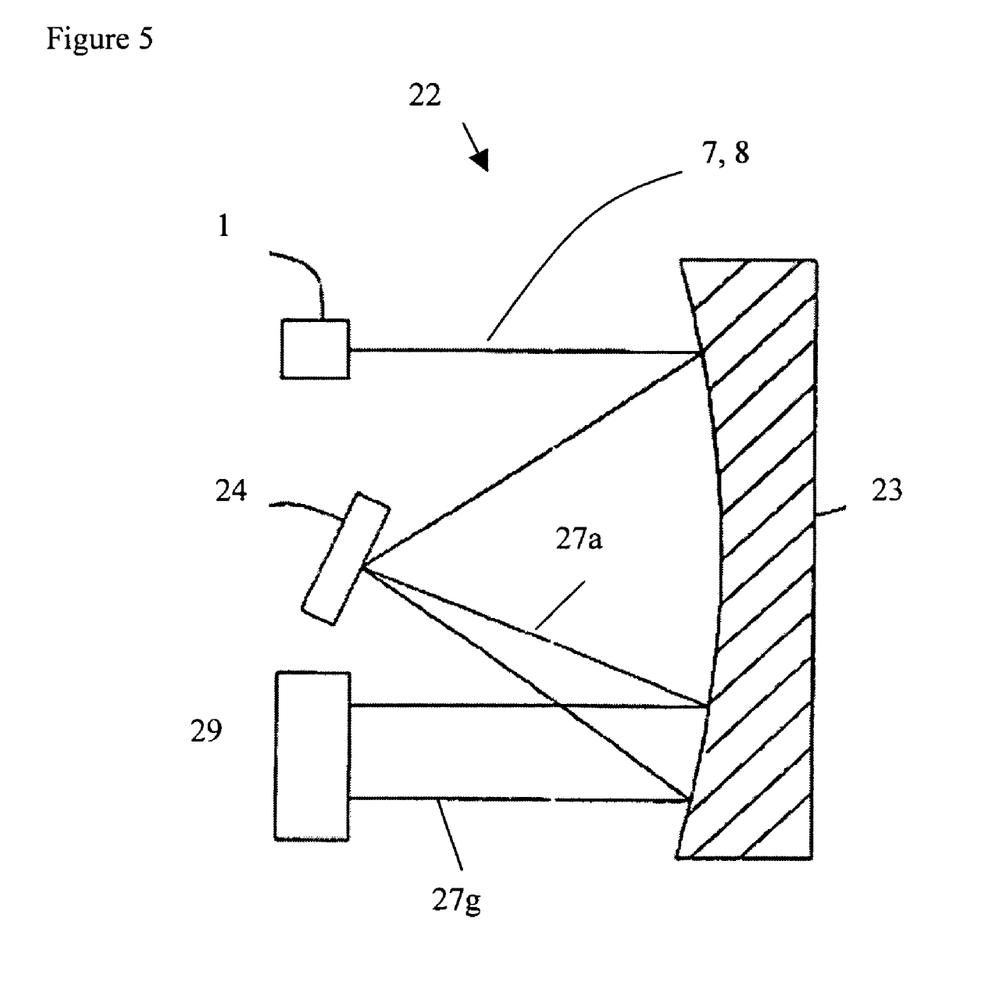
FIG. 5 is a schematic representation of an optical device platform utilizing the circulator of FIGS. 1 to 3.

With reference to FIG. 5, the present invention was designed for use as the circulator front end 1 for an optical device platform 22, which can be used for various devices, e.g. a wavelength switch or a dynamic gain equalizer. Within the platform 22 the sub-beams 7 and 8 are directed at a focusing and redirecting element in the form of a concave mirror 23, which reflects the sub-beams 7 and 8 towards a wavelength dispersive element 24. The wavelength dispersive element 24 separates each sub-beam 7 and 8 into a set of distinct wavelength channel sub-beams 27a to 27g and 28a to 28g, respectively, and directs the wavelength channel subbeams 27a to 27g and 28a to 28g towards the concave mirror 23 for a second refocusing and reflection. Subsequently, the wavelength channel sub-beams 27a to 27g and 28a to 28g are directed at a modifying element 29, which can be in the form of a micro-electro-mechanical (MEMs) mirror array for the wavelength switch or an array of liquid crystal cells for the dynamic gain equalizer. The MEMs mirror array would redirect one or more pairs of the wavelength channel sub-beams, e.g. 27b and 28b, 27c and 28c, along a different path, while the remaining wavelength channel sub-beams 27a, 28a, 27d to 27g and 28d to 28g are reflected back to the dispersive element 24 via the concave mirror 23 for recombination into sub-beams 7' and 8'. The recombined sub-beams 7' and 8' are reflected via the concave mirror 23 to the front-end circulator 1.

Alternatively, if the modifying element 29 is an array of liquid crystal cells, the polarizations of the various wavelength channel sub-beams 27a to 27g and 28a to 28g are independently rotated by desired amounts, depending on the amount of attenuation that is required. Accordingly, when the wavelength channel sub-beams 27a to 27g and 28a to 28g pass through any polarization beam splitter an amount of unwanted light can be separated from the remaining beams. This separation can be done in the modifying element 29 or at the circulator front end 1.

Figure 2:
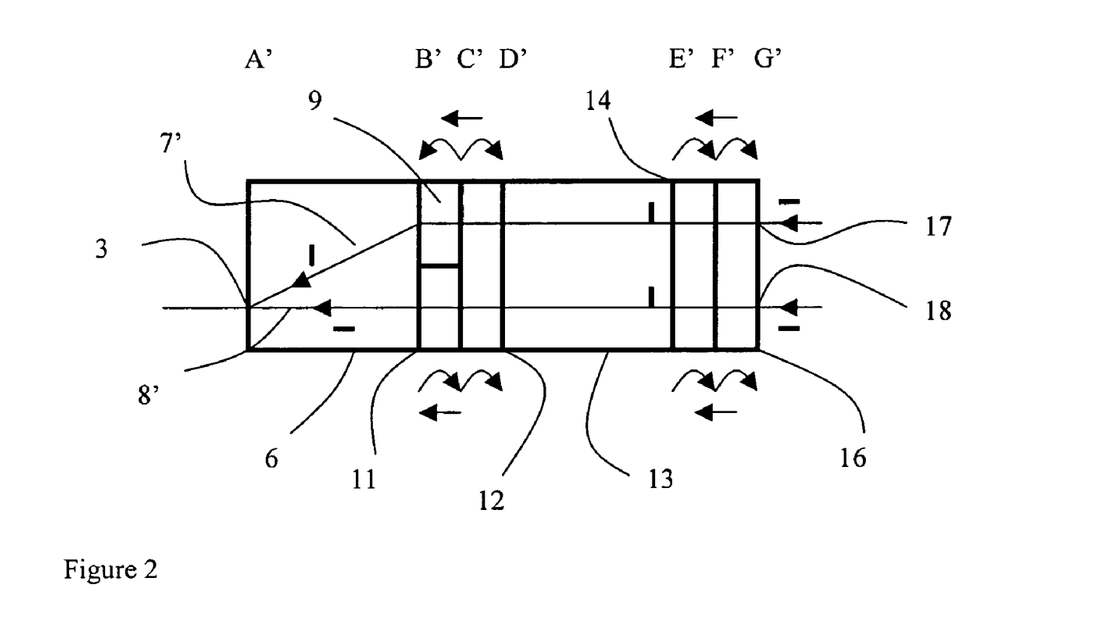
FIG. 2 is a plan view of the circular of FIG. 1 illustrating light traveling from the third and fourth ports to a second port.
Figure 3:
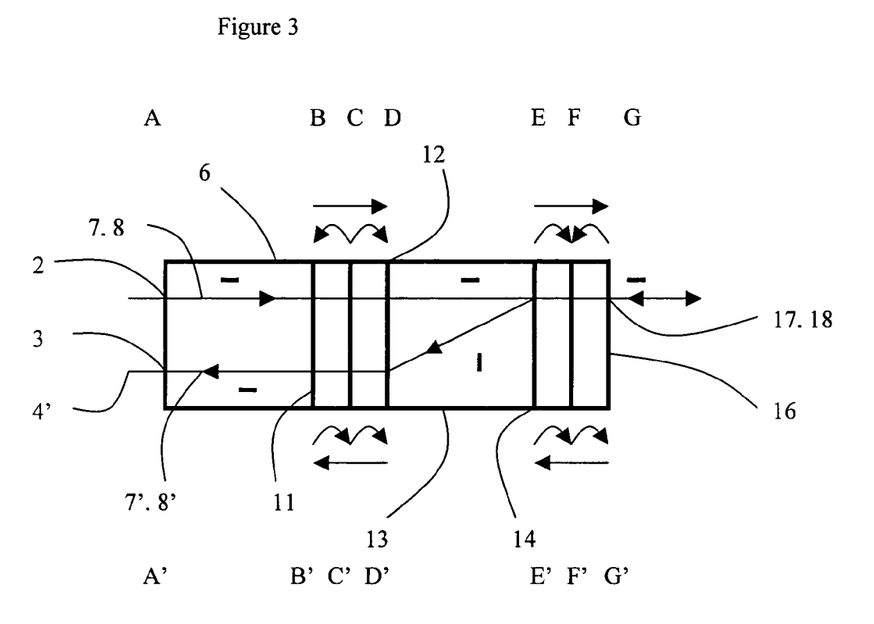
FIG. 3 is a side of the circulator of FIGS. 1 and 2 illustrating light traveling from the first port to the third and fourth ports, and from the third and fourth ports to the second port.

With reference to FIGS. 2 and 3, the recombined sub-beams 7' and 8' re-enter the third and fourth ports 17 and 18, respectively, (Position G'), and pass through the third half-wave plate 16 and the second Faraday rotator 14. Since the third half-wave plate 16 is a reciprocal polarization rotator, the polarization of both sub-beams 7' and 8' is rotated by +45° (Position F'); however, since the second Faraday rotator 14 is a non-reciprocal polarization rotator, the polarization of both sub-beams 7' and 8' is rotated by another +45° for a combined total of +90°, e.g. from horizontally to vertically polarized (Position E'). As a result, the sub-beams 7' and 8' get walked off by the second birefringent walk-off crystal 13. Up until now the sub-beams 7, 8, 7' and 8' have traveled in the same plane, illustrated in FIG. 1 and the upper path in FIG. 3, through the circulator 1; however, because the birefringent axis of the second birefringent walk-off crystal 13 is perpendicular to the birefringent axis of the first birefringent walk-off crystal 6, the second birefringent walk-off crystal 13 redirects the sub-beams 7' and 8' out of the original plane to a parallel plane, illustrated in FIG. 2 and the lower path in FIG. 3 (Position D').

The sub-beam 7', traveling in the opposite direction to sub-beam 7, passes through the first Faraday rotator 12 (+45°) and the first half-wave plate 9 (−45°), which results in no cumulative effect to the polarization thereof, e.g. stays vertically polarized (Position B'). The sub-beam 8' passes through the Faraday rotator 12 (+45°) and the second half-wave plate 11 (+45°), which rotates the polarization of the sub-beam 8' (+90°) from vertically to horizontally polarized (Position B'). Accordingly, the sub-beam 7' is walked off by the first walk-off crystal 6, towards the sub-beam 8', which passes straight through the first walk-off crystal 6. The recombined beam of light 4' is then output the second port 3 (Position A').

With reference to the bottom row of FIG. 4, any vertically polarized light 7" and 8" re-entering the third and fourth ports 17 and 18, respectively, (Position G"), will pass through the third half-wave plate 16 (+45°) and the second Faraday rotator 14 (+45°), resulting in a change in the state of polarization of +90°, e.g. vertically to horizontally polarized (Position E"). The horizontally polarized light 7" and 8" will not be walked off to the lower plane by the second birefringent walk-off crystal 13, but will pass therethrough in the original (upper) plane (Position D"). The first Faraday rotator 12 (+45°) and the first half-wave plate 9 (−45°) have no cumulative effect on the polarization of the sub-beam 7", which stays horizontally polarized (Position B"). The first Faraday rotator 12 (+45°) and the second half-wave plate 11 (+45°) rotate the polarization of the sub-beam 8" by 90° from horizontally polarized to vertically polarized (Position B"). Accordingly, the sub-beam 7" passes straight through the first birefringent walk-off crystal 6, while the sub-beam 8" gets walked off away from the sub-beam 7". Neither sub-beam 7" or 8" gets directed to the input port 2 or the output port 3, i.e. both sub-beam 7" and 8" are spilled off.

An alternative embodiment, for use in collimated space, is illustrated in FIGS. 6 to 10. An input port 31 comprises a ferrule 32 surrounding an end of an input fiber 33, which launches a beam of light 34 into a GRIN lens 36 (Position I). A polarization beam splitter in the form of a first birefringent crystal 37 (Rutile or $YVO_4$) divides the beam 34 into first and second orthogonally polarized sub-beams 38 and 39 (Position II). A first half-wave plate 41, with its birefringent axis oriented at +22.5°, rotates the polarization of the first sub-beam 38 by +45° (Position III), after which a first Faraday rotator 42 rotates the polarization of the first sub-beam 38 by an additional +45° (Position IV), whereby the polarization of the first sub-beam is rotated from horizontal to vertical. A second half-wave plate 43, with its birefringent axis oriented at −22.5°, rotates the polarization of the second sub-beam 39 by −45° (Position III), after which the first Faraday rotator 42 rotates the polarization of the second sub-beam 38 by +45° (Position IV), whereby the polarization of the second sub-beam 38 remains the same, e.g. vertically polarized. A polarization beam director, in the form of a polarization beam splitting prism 44 with a pair of polarization beam splitting coating 46a and 46b, redirects the vertically polarized first and second sub-beams 37 and 38 to a third half-wave plate 47 (Position V), with its birefringent axis oriented at +22.5°, which rotates the polarization of both sub-beams by +45° (Position VI). A second Faraday rotator 48 rotates the polarization of the first and second sub-beams 37 and 38 by a further +45°, whereby the first and second sub-beams are horizontally polarized for output the third and fourth ports 51 and 52 into the optical device platform (Position VII), as hereinbefore described.

Figures 8, 9:
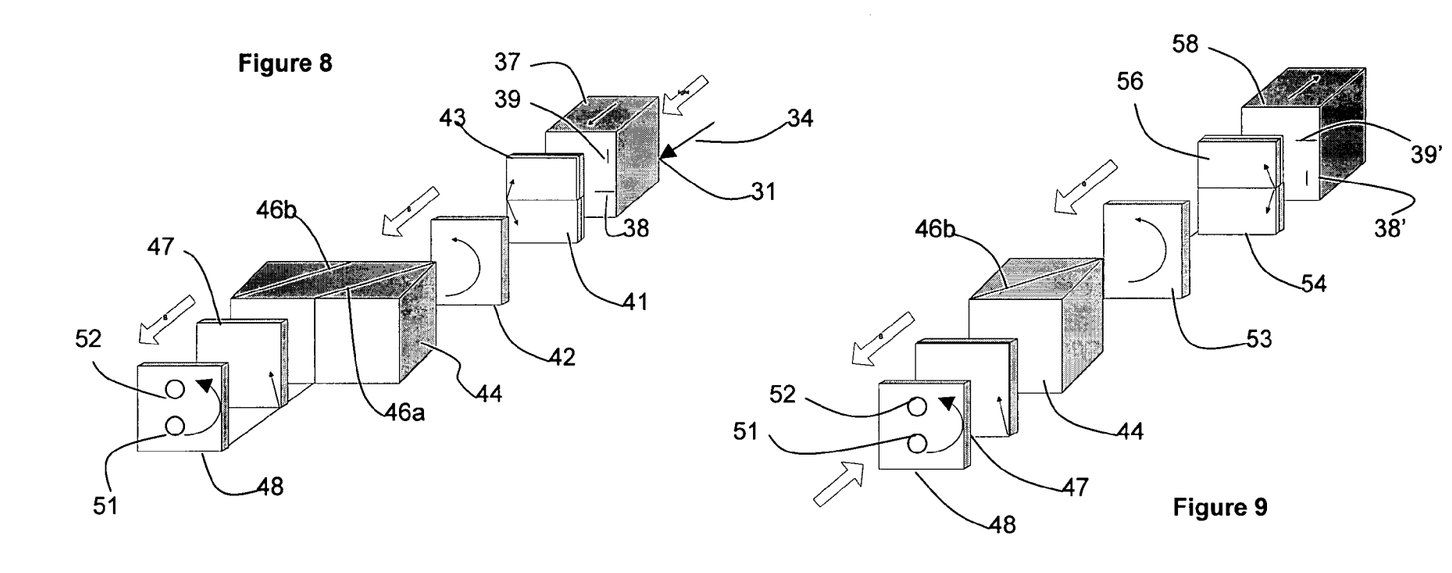
FIG. 8 is an exploded isometric view of the circulator of FIGS. 5 and 6 illustrating light traveling from the first port to the third and fourth ports.
FIG. 9 is an exploded isometric view of the circulator of FIGS. 5, 6 and 7 illustrating light traveling from the third and fourth ports to the second port.
Figure 10:
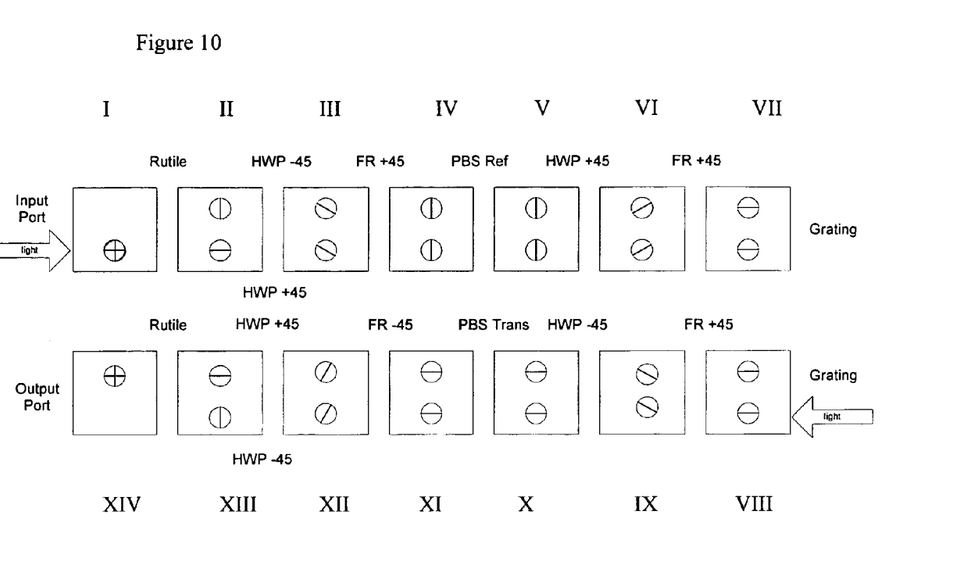
FIG. 10 is a chart of the polarizations of sub-beams of light traveling through the various elements of the circulator of FIGS. 5 to 8.

Modified sub-beams 37' and 38' re-entering the third and fourth ports 51 and 52, respectively, (Position VIII) pass back through the second Faraday rotator 48, which again rotates their polarization by +45° (Position IX). The third half-wave plate 47 negates the aforementioned polarization rotation by rotating the polarization of the modified sub-beams 37' and 38' by –45°, whereby the modified sub-beams 37' and 38' re-enter the polarization beam splitting cube 44 horizontally polarized (Position X), instead of vertically polarized, as before. Accordingly, the modified sub-beams 37' and 38' pass directly through the polarization beam splitting coating 46b to a third Faraday rotator 53 (Position XI), which rotates the polarization of both modified sub-beams 37' and 38' by –45° (Position XII). A fourth half-wave plate 54 rotates the polarization of the first modified sub-beam 37' by a further –45°, whereby the first modified sub-beam 37' becomes vertically polarized (Position XIII). A fifth half-wave plate 56 negates the effect of the third Faraday rotator 49 by rotating the polarization of the second modified sub-beam 38' by +45°, whereby the second modified sub-beam 38' remains horizontally polarized (Position XIII). A single magnet 57 is provided for use with all three Faraday rotators 42, 47 and 49.

Figure 6:
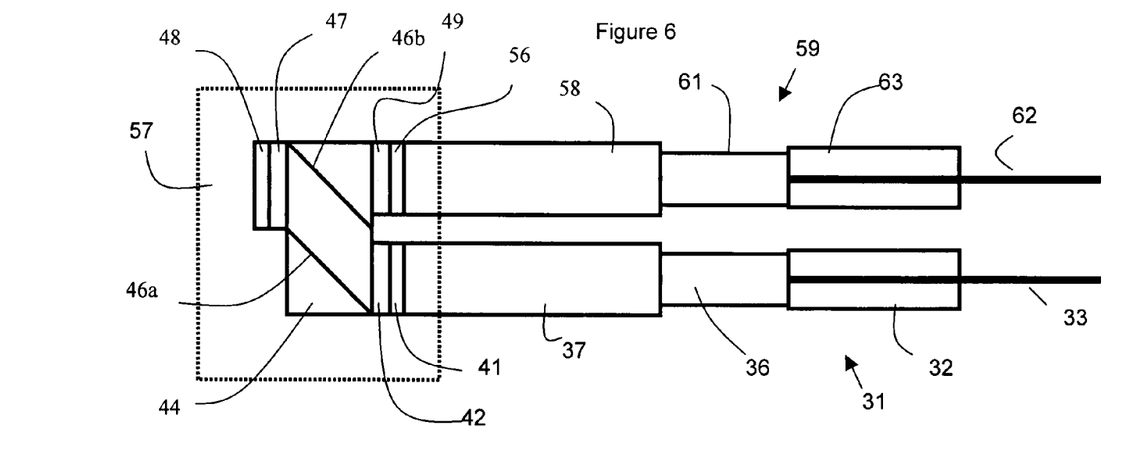
FIG. 6 is a plan view of an alternative embodiment of the present invention.
Figure 7:
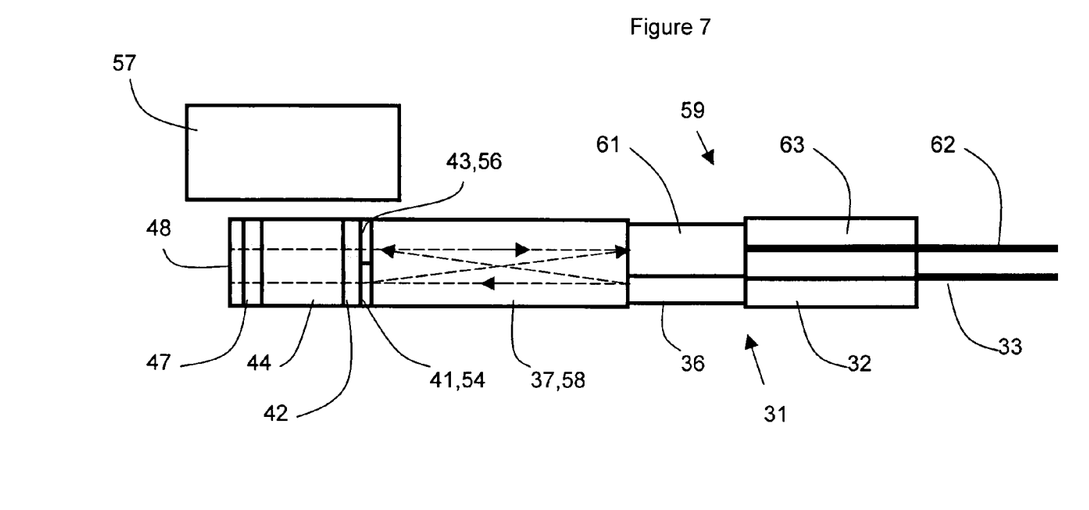
FIG. 7 is a side view of the embodiment of FIG. 5.

A polarization beam combiner, in the form of a second birefringent walk-off crystal 58, recombines the first and second modified sub-beams 37' and 38' into a single beam 34' for output the output port 59. A second GRIN lens 61 focuses the beam 34' onto an output fiber 62, which is encased in a ferrule 63.

We claim:

1. A circulator device for launching on optical signal into an optical device and for outputting the optical signal after modification by the optical device comprising:
    an input port for inputting the optical signal;
    a polarization beam splitter optically coupled to the input port for separating the optical signal into first and second orthogonally polarized sub-beams;
    a first polarization rotator for rotating the polarization of at least one of the first and second orthogonally polarized sub-beams of the optical signal, so that both sub-beams of the optical signal have the same polarization;
    polarization beam directing means for directing optical sub-beams with a first polarization along one set of paths, and for directing optical sub-beams with a second polarization along another set of paths;
    non-reciprocal polarization rotating means for rotating the polarization of optical sub-beams traveling in a first direction therethrough, while having no overall effect on the polarization of optical sub-beams traveling in a second direction therethrough;
    a first input/output port for outputting the first sub-beam of the optical signal with the first polarization, and for inputting a first sub-beam of the modified optical signal with the first polarization, whereby the first sub-beam of the modified optical signal travels back through the non-reciprocal polarization rotating means and the polarization beam directing means;
    a second input/output port for outputting the second sub-beam of the optical signal with the first polarization, and for inputting a second sub-beam of the modified optical signal with the first polarization, whereby the second sub-beam of the modified optical signal travels back through the non-reciprocal polarization rotating means and the polarization beam directing means;
    a second polarization rotator for rotating the polarization of at least one of the first and second sub-beams of the modified optical signal, so that the sub-beams of the optical signal have orthogonal polarizations;
    a polarization beam combiner optically coupled to the output port for combining first and second orthogonally polarized sub-beams of the modified optical signal; and
    an output port for outputting the modified optical signal;
    whereby light entering the first and second input/output ports with the second polarization will be directed away from the input and output ports.

2. The circulator device according to claim 1, wherein the polarization beam directing means comprises a prism with a pair of polarization beam splitting coatings for redirecting the sub-beams of the optical signal or the sub-beams of the modified optical signal from a first pair of paths to a second pair of paths, which are parallel to the first pair of paths.

3. The circulator device according to claim 2, wherein the polarization beam combiner comprises a birefringent crystal disposed in the first pair of paths; and wherein the polarization beam splitter comprises a birefringent crystal disposed in the second pair of paths.

4. The circulator device according to claim 1, wherein the input port comprises a lens for collimating the optical signal launched from an input fiber; and
    wherein the output port comprises a lens for focusing the modified optical signal onto an output fiber.

5. The device according to claim 1, wherein the polarization beam directing means comprises a first birefringent walk-off crystal with a first birefringent axis; and wherein the polarization beam splitter and the polarization beam combiner comprise a second birefringent walk-off crystal with a second birefringent axis, perpendicular to the first birefringent axis.

6. The circulator device according to claim 1, wherein the first polarization rotator means comprises:
    a first half wave plate for rotating the polarization of one of the first and second sub-beams of the optical signal by 45° in a first direction;
    a second half wave plate for rotating the polarization of the other one of the first and second sub-beams of the optical signal by 45° in a second direction opposite to the first direction; and
    a Faraday rotator for rotating the first and second sub-beams of the optical signal by 45° in the first direction when passing in one direction therethrough and by 45° in the second direction when passing in the opposite direction therethrough.

7. The circulator device according to claim 1, wherein each of the first and second non-reciprocal polarization rotator comprises a half wave plate for rotating the polarization of the first and second sub-beams by 45°; and a Faraday rotator for rotating the polarization of the first and second sub-beams by 45° in a first direction for sub-beams traveling in one direction therethrough and in a second direction, which is opposite to the first direction, for sub-beams traveling in the opposite direction therethrough.

8. A circulator device for launching on optical signal into an optical device for modification and for outputting the modified optical signal comprising:
- a first port for inputting the optical signal;
- a second port adjacent the first port for outputting the modified optical signal;
- a polarization beam splitter/combiner optically coupled to the first port for separating the optical signal into first and second orthogonally polarized sub-beams, and optically coupled to the second port for combining first and second orthogonally polarized sub-beams of the modified optical signal;
- polarization rotator for rotating the polarization of at least one of the first and second orthogonally polarized sub-beams of the optical signal, so that both sub-beams of the optical signal have the same polarization, and for rotating the polarization of at least one of the first and second sub-beams of the modified optical signal so that the sub-beams of the modified optical signal have orthogonal polarizations;
- polarization beam directing means for directing optical sub-beams with a first polarization along one set of paths, and for directing optical sub-beams with a second polarization along another set of paths;
- non-reciprocal polarization rotating means for rotating the polarization of optical sub-beams traveling in a first direction therethrough, while having no overall effect on the polarization of optical sub-beams traveling in a second direction therethrough;
- a third port for outputting the first sub-beam of the optical signal with the first polarization, and for inputting the first sub-beam of the modified optical signal with the first polarization;
- a fourth port for outputting the second sub-beam of the optical signal with the first polarization, and for inputting the second sub-beam of the modified optical signal with the first polarization;
- whereby light entering the third and fourth ports with the second polarization will be directed away from the first and second ports.

9. The device according to claim 8, wherein the polarization rotator comprises:
- a first half wave plate for rotating the polarization of one of the first and second sub-beams of the optical signal and one of the first and second sub-beams of the modified optical signal by 45° in a first direction;
- a second half wave plate for rotating the polarization of the other one of the first and second sub-beams of the optical signal and the other one of the first and second sub-beams of the modified optical signal by 45° in a second direction, which is opposite to the first direction, whereby both the first and second sub-beams have the same polarization; and
- a Faraday rotator for rotating the first and second sub-beams of the optical signal by 45° in one direction when passing in one direction therethrough and by 45° in the second direction when passing in the opposite direction therethrough.

10. The device according to claim 8, wherein the polarization beam directing means comprises a first birefringent walk-off crystal with a first birefringent axis; and wherein the polarization beam splitter/combiner comprises a second birefringent walk-off crystal with a second birefringent axis, perpendicular to the first birefringent axis.

11. The device according to claim 8, wherein the non-reciprocal polarization rotator comprises a half wave plate for rotating the polarization of the first and second sub-beams by 45°; and a Faraday rotator for rotating the polarization of the first and second sub-beams by 45° in a first direction for sub-beams traveling in one direction therethrough and in a second direction, which is opposite to the first direction, for sub-beams traveling in the opposite direction therethrough.

12. A circulator comprising:
- a first port for inputting an input optical beam;
- a second port adjacent the first port for outputting a output optical beam;
- a polarization beam splitter/combiner for separating the input optical beam into orthogonally polarized sub-beams, and for combining orthogonally polarized sub-beams of the output optical beam;
- polarization rotating means for rotating the polarization of at least one of the orthogonally polarized sub-beams of the input optical beam, so that both sub-beams of the input optical beam have the same polarization, and for rotating the polarization of at least one of the sub-beams of the output optical beam so that the sub-beams of the output optical beam have orthogonal polarizations;
- polarization beam directing means for directing optical sub-beams with a first polarization along one set of paths, and for directing optical sub-beams with a second polarization along another set of paths;
- non-reciprocal polarization rotating means for rotating the polarization of optical sub-beams traveling in a first direction, while having no overall effect on the polarization of optical sub-beams traveling in a second direction;
- a third port for outputting one of the sub-beams of the input optical beam with the first polarization, and for inputting one of the sub-beams of the output optical beam with the first polarization;
- a fourth port for outputting the other of the sub-beams of the input optical beam with the first polarization, and for inputting the other of the sub-beams of the output optical beam with the first polarization;
- whereby light not having the first polarization entering the third and fourth ports with be spilled off without reaching the first or the second ports.

* * * * *